(12) United States Patent
Goldberg et al.

(10) Patent No.: US 7,673,037 B2
(45) Date of Patent: Mar. 2, 2010

(54) CABLE TELEPHONY MONITORING SYSTEM

(75) Inventors: Harold J. Goldberg, Newark, NJ (US); Chaim Ackerman, Newark, NJ (US); Dominic Lunanuova, Newark, NJ (US)

(73) Assignee: Net2Phone, Newark, NJ (US)

( * ) Notice: Subject to any disclaimer, the term of this patent is extended or adjusted under 35 U.S.C. 154(b) by 1665 days.

(21) Appl. No.: 10/777,194

(22) Filed: Feb. 13, 2004

(65) Prior Publication Data

US 2005/0182835 A1   Aug. 18, 2005

(51) Int. Cl.
   *G06F 15/173* (2006.01)
(52) U.S. Cl. .............................. 709/224; 714/4; 714/763
(58) Field of Classification Search ......... 709/223–224; 714/4, 763
   See application file for complete search history.

(56) References Cited

U.S. PATENT DOCUMENTS

| | | | |
|---|---|---|---|
| 5,611,038 A | | 3/1997 | Shaw et al. |
| 5,640,505 A | * | 6/1997 | Hearn et al. .................... 714/4 |
| 5,664,093 A | * | 9/1997 | Barnett et al. ................. 714/31 |
| 5,666,481 A | * | 9/1997 | Lewis ............................ 714/4 |
| 5,982,753 A | | 11/1999 | Pendleton et al. |
| 6,006,016 A | | 12/1999 | Faigon et al. |
| 6,279,033 B1 | | 8/2001 | Selvarajan et al. |
| 6,430,607 B1 | | 8/2002 | Kavner |
| 6,529,475 B1 | | 3/2003 | Wan et al. |
| 6,553,507 B1 | * | 4/2003 | Cohen ........................... 714/4 |
| 6,671,818 B1 | * | 12/2003 | Mikurak ........................ 714/4 |
| 6,694,455 B1 | * | 2/2004 | Scrandis et al. ............... 714/31 |
| 6,701,342 B1 | | 3/2004 | Bartz et al. |
| 6,892,236 B1 | | 5/2005 | Conrad et al. |
| 6,976,090 B2 | | 12/2005 | Ben-Shaul et al. |
| 7,082,422 B1 | | 7/2006 | Zirngibl et al. |
| 7,275,016 B2 | * | 9/2007 | Gross et al. .................. 702/182 |
| 2004/0120250 A1 | * | 6/2004 | Langevin et al. ............. 370/216 |
| 2005/0038832 A1 | * | 2/2005 | Feigenbaum ................. 707/202 |
| 2005/0172162 A1 | * | 8/2005 | Takahashi et al. .............. 714/4 |
| 2006/0143496 A1 | * | 6/2006 | Silverman ...................... 714/4 |

FOREIGN PATENT DOCUMENTS

JP   2001086117 A  *  3/2001

OTHER PUBLICATIONS

International Search Report mailed Sep. 6, 2006 in corresponding PCT Application No. PCT/US2004/041408.
Written Opinion of the International Searching Authority mailed Sep. 6, 2005 in corresponding PCT Application No. PCT/US2004/041408.
BSR 64000, Broadband Services Router 64000 Product Detail, Motorola, Inc., http://broadband.motorola.com/catalog/productdetail.asp?image=large&productID=191, printed on Feb. 11, 2004, 1 page.

(Continued)

*Primary Examiner*—Oanh Duong
(74) *Attorney, Agent, or Firm*—Davidson Berquist Jackson & Gowdey LLP

(57) ABSTRACT

A method and system for monitoring the statuses of components within a telephony system, especially a cable-based telephony system, and to monitor quality issues within such system. By determining how components with the system are behaving, a network administrator may be able to troubleshoot problems remotely using a known set of problem resolution techniques. Such techniques may be applied stepwise by the administrator or may be automated through computer intervention.

20 Claims, 12 Drawing Sheets

OTHER PUBLICATIONS

CAS 2000, Cable Access System 2000 Product Detail, Motorola, Inc., http://broadband.motorola.com/catalog/productdetail.asp?image=large&productID=222, printed on Feb. 11, 2004, 2 pages.

CentriQ 1000 Communications Gateway Product Information and Specifications, Motorola, Inc., c2000, 2 pages.

CG4500 Communications Gateway Product Information and Specifications, Motorola, Inc., c2001, 2 pages.

CG4501 Communications Gateway Product Information and Specifications, Motorola, Inc., c2002, 2 pages.

Motorola Advanced Provisioning System Product Detail, Motorola, Inc., http://broadband.motorola.com/catalog/productdetail.asp?image=large&productID=193, printed on Feb. 11, 2004, 2 pages.

Motorola NIS Solutions—HFC Access, Motorola, Inc., c1994-2003, http://broadband.motorola.com/nis/hfc_access.html, printed on Feb. 11, 2004, 3 pages.

Motorola NIS Solutions—PacketCable, Motorola, Inc., c1994-2003, http://broadband.motorola.com/nis/packet_cable.html, printed on Feb. 11, 2004, 5 pages.

Motorola's NETsolutions Group, Motorola, Inc., c2004, http://broadband.motorola.com/noflash/netsolutions.html, printed on Feb. 11, 2004, 2 pages.

NETadvantageTM Services, Motorola, Inc., c2004, http://broadband.motorola.com/noflash/netadvantage.html, printed on Feb. 11, 2004, 2 pages.

NETwork Support Services, Motorola, Inc., c2004, http://broadband.motorola.com/noflash/networksupport.html, printed on Feb. 11, 2004, 2 pages.

SBV4200 VoIP Cable Modem Product Details, Motorola, Inc., http://broadband.motorola.com/catalog/productdetail.asp?ProductID=208, printed on Feb. 11, 2004, 1 page.

SURFboard® SBV4200 VoIP Cable Modem Product Information and Specifications, Motorola, Inc., c2002, 2 pages.

SURFboard® VT1000 Voice Terminal Product Information and Specifications, Motorola, Inc., c2002, 2 pages.

\* cited by examiner

Telephony Management System

Question: Why is router running slowly

Description: This router can run slowly for a number of reasons, including having to process too many temporary files, the routing rules are too complex, and the system idle process is stuck.

Possible resolution #1: Edit the routing rules to reduce their complexity. This will increase the speed of routing decisions and free CPU time for other processes.

Resolved problem: ◯ 100%  ◯ 75%  ◯ 50%  ◯ 0  [Submit]

Possible resolution #2: Clear the temporary file folder of all files older than 2 days to reduce the amount of processing that is performed.

Resolved problem: ◯ 100%  ◯ 75%  ◯ 50%  ◯ 0  [Submit]

Possible resolution #3: Mark the equipment as not accepting new calls. When all calls on this equipment have terminated, then remotely power cycle the equipment.

Resolved problem: ◯ 100%  ◯ 75%  ◯ 50%  ◯ 0  [Submit]

Figure 8a

| Telephony Management System |
|---|

Question: Why is router running slowly

Description: This router can run slowly for a number of reasons, including having to process too many temporary files, the routing rules are too complex, and the system idle process is stuck.

Possible resolution #1: Clear the temporary file folder of all files older than 2 days to reduce the amount of processing that is performed.

Resolved problem: ○100% ○75% ○50% ○ 0 [Submit]

Possible resolution #2: Edit the routing rules to reduce their complexity. This will increase the speed of routing decisions and free CPU time for other processes.

Resolved problem: ○100% ○75% ○50% ○ 0 [Submit]

Possible resolution #3: Mark the equipment as not accepting new calls. When all calls on this equipment have terminated, then remotely power cycle the equipment.

Resolved problem: ○100% ○75% ○50% ○ 0 [Submit]

Figure 8b

Telephony Management System

Error type: 55    Equipment Type: SW 55

Company: Comp_1

---

Description: This equipment is reporting that a software upgrade is available from the equipment manufacturer and that the severity of the error to be corrected is high.

---

Possible resolution #1: To upgrade the equipment:

1. ftp the latest software from the manufacturer's web site to the equipment's root directory,
2. Mark the equipment as "going off-line" so that no more calls are routed through it,
3. After all calls have terminated that use this router, remotely power cycle the equipment.

Resolved problem:  ○100%  ○75%  ○50%  ○ 0 | Submit |

Figure 9

| Telephony Management System |
|---|

| Error type: 55    Equipment Type: SW 55 |
|---|
| Company: Comp_1    Equip ID: 0x1234 |

| Description: This equipment is reporting that a software upgrade is available from the equipment manufacturer and that the severity of the error to be corrected is high. |
|---|

Possible resolution #1: To upgrade the equipment:

1. ftp the latest software from the manufacturer's web site to the equipment's root directory,
2. Mark the equipment as "going off-line" so that no more calls are routed through it,
3. After all calls have terminated that use this router, remotely power cycle the equipment.

Run script

Resolved problem: ○100% ○75% ○50% ○ 0  Submit

Figure 10

CABLE TELEPHONY MONITORING SYSTEM

CROSS-REFERENCE TO RELATED APPLICATION

The present application is related to U.S. patent application Ser. No. 09/575677, filed on Jun. 22, 2000, the contents of which are incorporated herein by reference.

BACKGROUND OF THE INVENTION

1. Field of the Invention

The present invention is directed to a method and system for monitoring and managing a telephony system, and, in one embodiment, to a method and system for monitoring and managing a packet-based telephony system.

2. Discussion of the Background

Telephones are used everyday for communicating between remotely located parties. Customers have come to rely on the telephone's presence for emergencies and everyday communications, so customers do not understand when there are problems or outages in phone service. Thus, customers expect that telephony companies will manage their systems to avoid such problems and outages.

A new type of telephone standard, however, is gaining popularity that utilizes telephony over packet-based communications systems (e.g., using packet-based services over a cable modem) and provides a number of new challenges and opportunities in the areas of communications management and monitoring. In such systems, telephony equipment (e.g., equipment compatible with the DOCSIS cable standards) is connected at a customer premises and interacts with termination equipment at a telephony provider's premises. Such customer equipment utilizes digital, packet-switched communications rather that analog, circuit-switched communications (e.g., as used in POTS-style services). In such new systems, call monitoring is really a monitoring of network connections, and the provision of "telephony service" is really the provision of packet routing services.

SUMMARY OF THE INVENTION

It is an object of the present invention to address telephony system monitoring and management and to provide a method for performing the same.

According to one aspect of the present invention, a telephony management system is provided that utilizes a graphical user interface (GUI) for assessing the operational status of equipment in a cable-based telephony system.

It is another aspect of the present invention that procedures for correcting errors reported by the GUI be linked to the GUI such that a network administrator can be provided with direct access to problem solving techniques.

It is yet a further aspect of the present invention that procedures for correcting errors reported by the GUI be automated by being linked to the GUI such that a network administrator can automatically launch the most recently approved set of solutions for fixing a problem identified by the GUI.

It is alternate aspect of the present invention to provide customer management services related to billing and customer origination.

Each of these aspects of the present invention can be practiced together or separately, and nothing within this specification constitutes a requirement that components described herein be used together unless expressly stated in the claims.

BRIEF DESCRIPTION OF THE DRAWINGS

A more complete understanding of the present invention may be had by reference to the attached drawings, wherein:

FIG. 8a is a representation of an initial interface for providing an initial set of possible solutions to a network administrator to help the administrator address a question posed by the administrator;

FIG. 8b is a representation of a subsequent interface for providing an updated set of possible solutions to a network administrator to help the administrator address a question posed by the administrator;

FIG. 9 is a representation of an interface for providing a possible solution to a network administrator to help the administrator address an identified problem;

FIG. 10 is a representation of an interface for automatically executing a possible solution to a network administrator to help the administrator address an identified problem.

DETAILED DESCRIPTION OF THE PREFERRED EMBODIMENTS

Figure 1:
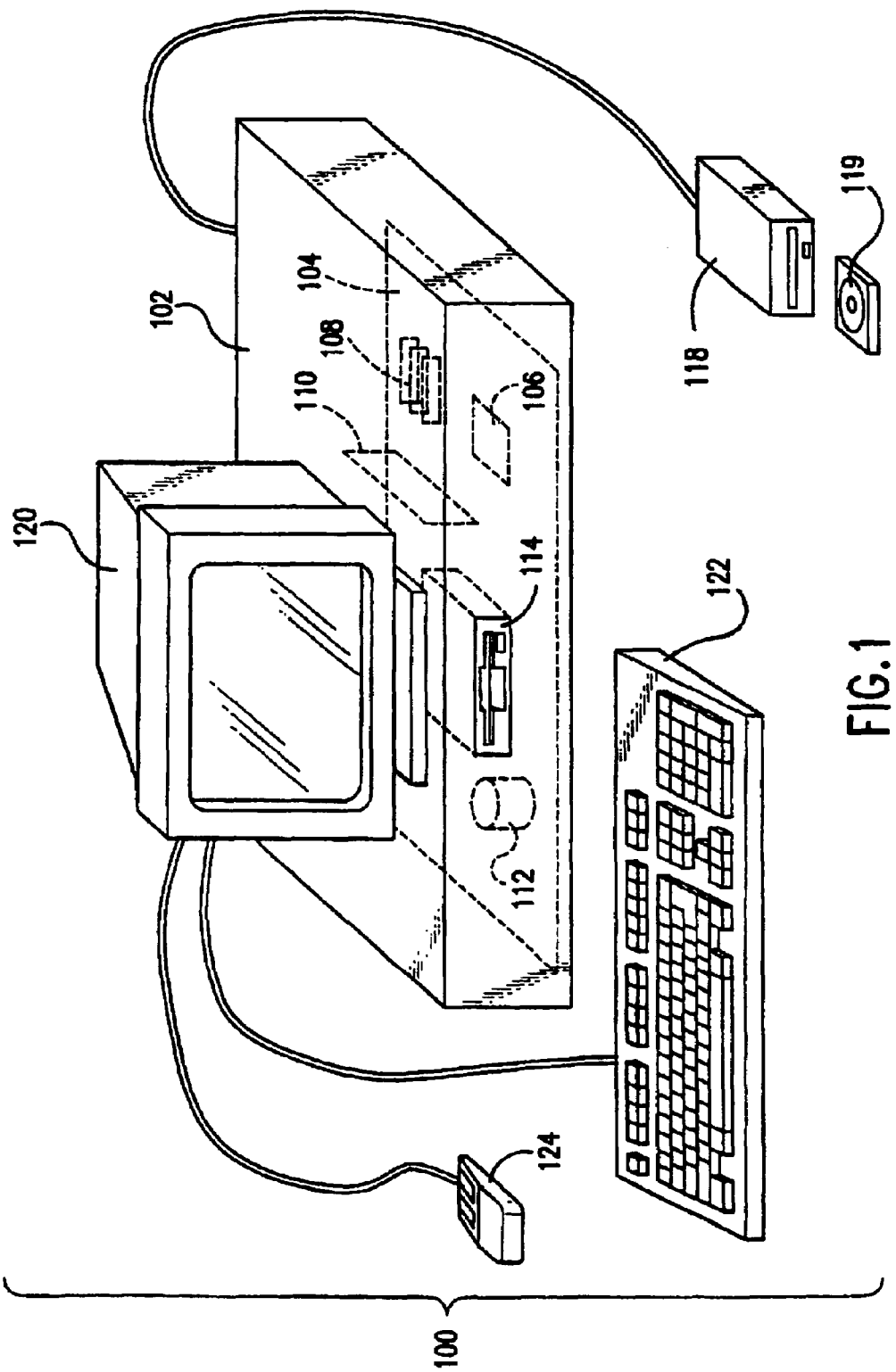
FIG. 1 is a schematic illustration of a computer system for monitoring a telephony system.

Turning to FIG. 1, there is shown a schematic illustration of an exemplary computer system 100 for monitoring a telephony system (e.g., a cable-based telephony system). The computer system 100 has a housing 102 which houses a motherboard 304 which contains a CPU 106 (e.g., Intel Pentium, Intel Pentium II, P3, P4, Intel Celeron, Intel Pentium M, Intel Itanium, HP Alpha, IBM/Motorola Power PC, AMD Athlon, AMD Duron, and Sun UltraSPARC), memory 108 (e.g., DRAM, ROM, EPROM, EEPROM, SRAM, SDRAM, RDRAM, and Flash RAM), and other optional special purpose logic devices (e.g., ASICs) or configurable logic devices (e.g., GAL and reprogrammable FPGA).

The computer 100 could further include plural input devices (e.g., a keyboard 122, mouse 124 and a modem, network interface card, or other communications adapter), and a display card 110 for controlling monitor 120. In addition the computer system 100 includes storage devices which can include a floppy disk drive 114; other removable media devices (e.g., compact disc or digital versatile disc 119, tape, and removable magneto-optical media); and a hard disk 112, or other fixed, high density media drives, connected using an appropriate devices bus (e.g., a SCSI bus, an Enhanced IDE bus, or a Serial ATA bus). Although compact disc 119 is shown in a disc caddy, the compact disc 119 can be inserted directly into CD-ROM drives which do not require caddies. Also connected to the same device bus or another device bus as the high density media drives the computer 100 may additionally include an optical disc (e.g., compact disc or DVD) reader 118, an optical disc reader/writer unit or an optical disc jukebox. In addition, a printer (not shown) also provides printed copies of reported errors or the status of various equipment.

The computer system 100 further includes at least one computer readable medium. Examples of such computer readable media are compact discs 119, hard disks 112, floppy disks, USB storage devices, tape, magneto-optical disks, PROMs (e.g., EPROM, EEPROM, Flash EPROM), DRAM, SRAM, SDRAM, and RDRAM. Stored on any one or on a combination of the computer readable media, the present invention includes software for controlling both the hardware of the computer 100 and for enabling the computer 100 to interact with a human user or other devices. Such software may include, but is not limited to, device drivers, operating systems and user applications, such as development tools and (graphical) system monitors. Together, the computer readable media and the computer code thereon form a computer program product of the present invention. Computer code for implementing the method of the present invention can be implemented in any conventional computer programming language or in a combination of computer programming languages, including assembly, procedural languages, and object oriented languages, and may be in any one or a combination of forms (e.g., executable programs, scripts, dynamic and statically linked libraries, and interpreted code). Examples of such languages include C, C++ and Java. Similarly, application development toolkits including objects, "widgets" and controls (e.g., Active X controls) can also be used. Any one or a combination of these types of code can be combined into a computer software component which can be run on a hardware component (e.g., any general purpose computer, digital signal processor (DSP)-based computer or custom-designed hardware including "system on a chip" design). Thus, the term "component" as used herein corresponds to any combination of hardware components and software components.

The computer also includes a communications interface for communicating with telephony switching equipment to determine the statuses of devices controlled by the switching equipment. Such status information may include any one or a combination of: on hook, off-hook, dialing, in use, ringing, busy, etc.

Figure 2:
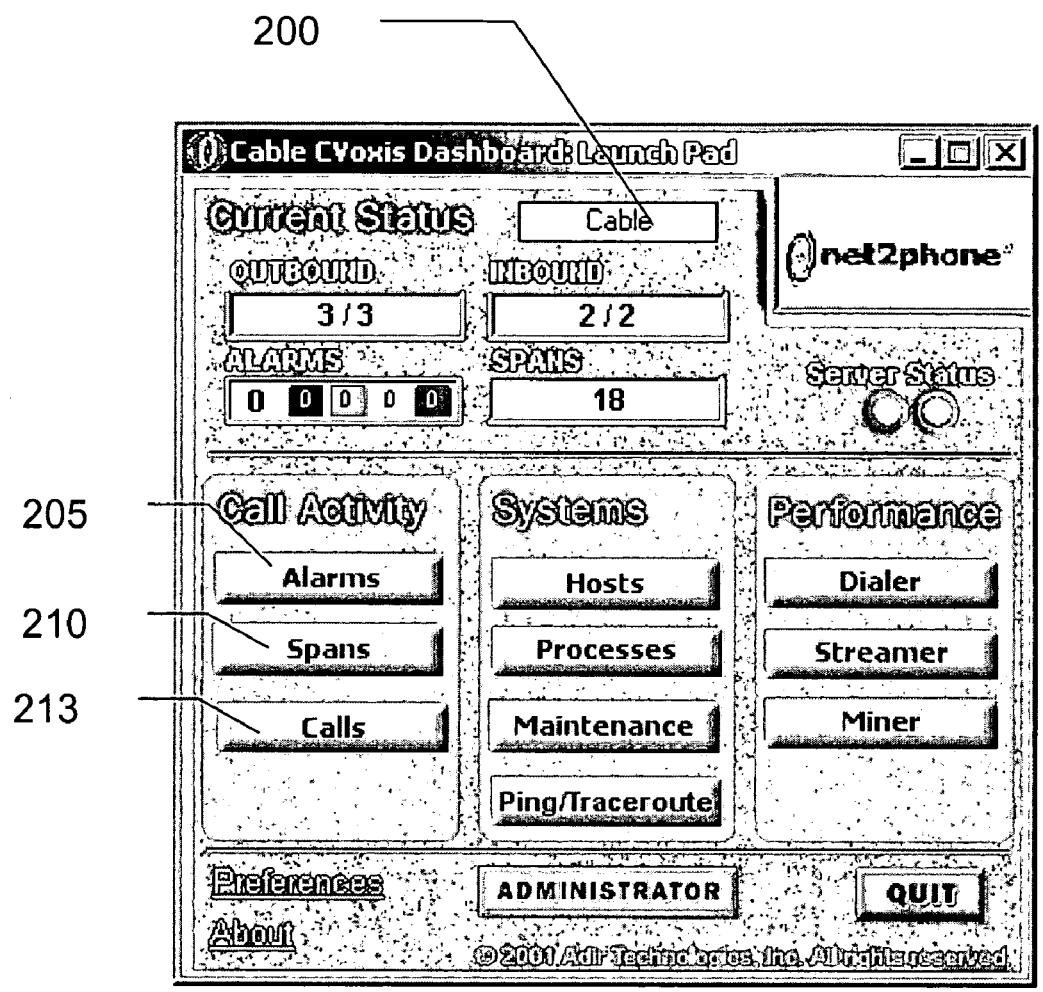
FIG. 2 is a screenshot of an exemplary overview portion of a graphical user interface (GUI) for monitoring the status of telephony equipment.

According to an exemplary embodiment of the present invention, an introductory or welcome screen, such as is shown in FIG. 2, is presented to a user as the user begins to use an exemplary monitoring and management system according to the present invention. (The use of this system presupposes the existence of an authorization module to authenticate users and assign security levels thereto. The system may require any one or a number of authentication procedures, e.g., password-based authentication, token authentication, biometric testing, and/or smartcards. Likewise, the system may be contained within a secure facility such that access to the system is simply determined by physical access to the computer housing the system.)

Using an interface such as the one shown in FIG. 2, a network administrator, having authenticated itself to the system if necessary, begins to monitor some number of groups of inbound and outbound links. In the example, 3 groups of outbound links are monitored and 2 inbound links, crossing 18 spans. The mode indicator 200 identifies that the system is currently monitoring cable-based communications as opposed to circuit-switched systems; however, the same system could be used to track circuit-switched systems as well. As illustrated, there are no alarms at any of the four alarm levels that are displayed. However, if any alarms did exist, the administrator would be able to click on the number of alarms at the level of interest to be routed to a further screen that displays further details about those alarms at that level. Similarly, by clicking on the "Alarms" button 205 under "Call Activity", the administrator would be routed to a further screen that shows the alarms at all the displayed levels.

Figure 3:
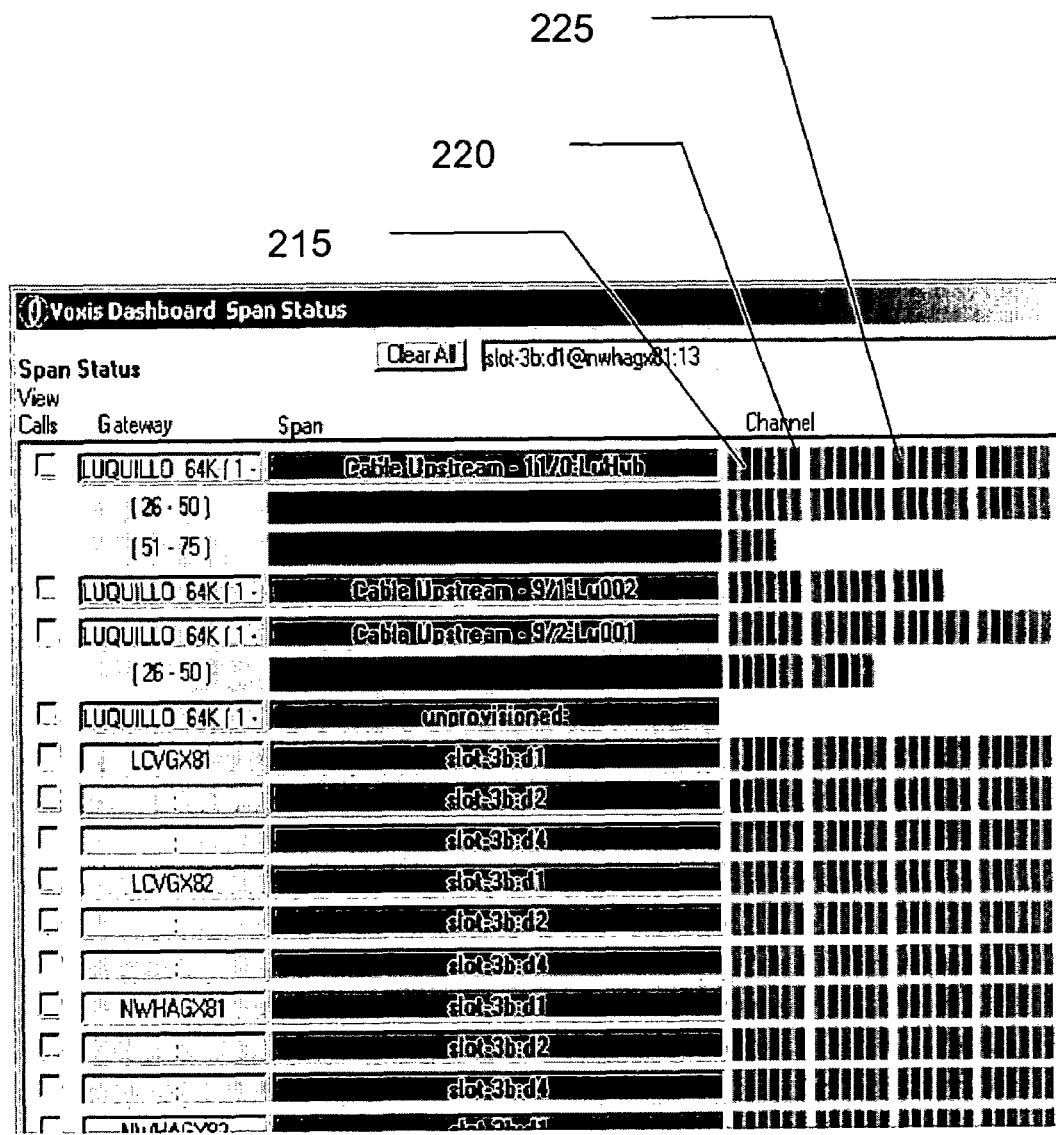
FIG. 3 is a screenshot of an exemplary call monitoring portion of a graphical user interface (GUI)

Likewise, the "Spans" button 210 causes a further user interface, such as the interface of FIG. 3, to appear, from which the administrator can determine the status of various portions of the system. As can be seen from the exemplary interface, a number of channels can be monitored in parallel such that the administrator can get an overall sense of the operation of multiple spans (or various parts of a single span) simultaneously. In the example of a system monitoring packet-based communications, the concept of a span may mean something other than a span in circuit switched communications. As used herein, when referring to a packet-based communications system, a span is a representation of a group of customer premise equipment (but not necessarily all of the customer premise equipment) that shares a communications medium (e.g., a cable) at or beyond a particular specified point. For example, a neighborhood of houses that has a single cable line shared by all the houses could result in a span representing that shared resource. (It should be noted that spans may be monitored at different points over the distance between the telephony provider and the customer premises. As such, certain spans may be combined into a single span over a portion of that distance, and certain spans may be divided into multiple spans at times.)

As shown in FIG. 3, a first span labeled "11/0:LuHub" (and corresponding to a first gateway) has 75 different endpoints associated therewith. (A single gateway, depending on its configuration, may control or service one or more spans.) The status (e.g., dialing) of a first endpoint is indicated by a first indicator bar 215 on the interface having a first color. The statuses (e.g., "call in progress" and "not responding") of second and third endpoints 220 and 225, respectively, are indicated by second and third indicator bars on the interface having second and third colors. In an exemplary embodiment, "dialing" is represented by violet, "in progress" is represented by green, and "not responding" is represented by red. Using this type of interface, an administrator can quickly identify the problem areas and begin investigating what might be causing the issue(s).

In the example of a "dialing" endpoint, the administrator may wish to obtain additional information about the dialing process. By using a first selection method (e.g., single-clicking) on the corresponding indicator bar 215, the administrator can determine dialing specific information about the potential call (e.g., how long the call has been ringing). Similarly, if the administrator wishes to obtain information about a call "in progress", the administrator may use the first selection method (or another selection method) on the corresponding indicator bar 220 to obtain additional information. (The administrator can use the same selection method on different indicator bars but receive different interfaces by virtue of the fact that the system may utilize the call status information as a modifier for the response behavior for a selection technique.) The administrator may likewise get call information by using the "Calls" button 213 which will provide an alternate interface (e.g., a list or drop-down box) of calls for which additional information is available.

Figure 4:
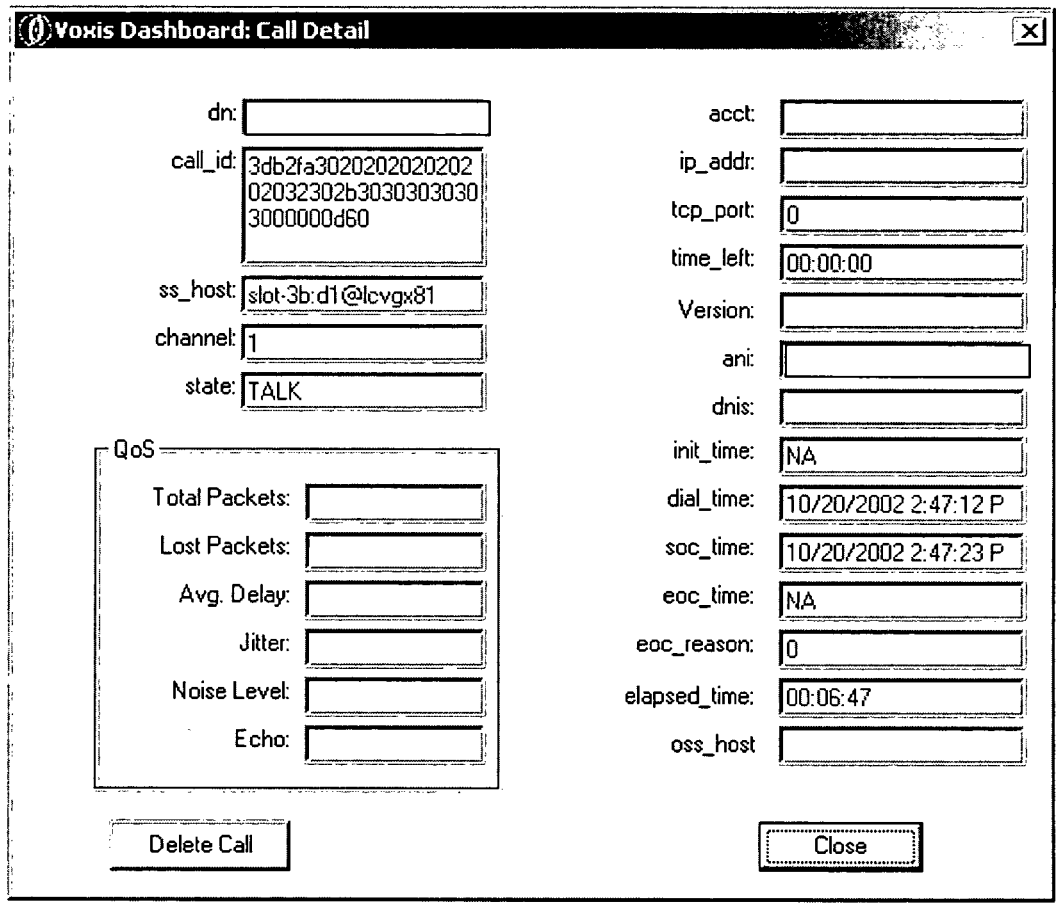
FIG. 4 is a screenshot of an exemplary call detail monitoring portion of a graphical user interface (GUI)

An example of an interface for displaying additional status information about a call is shown in FIG. 4. In FIG. 4, various exemplary status fields are shown, although more or less information than illustrated can be displayed. In the illustration, inbound and outbound numbers of a call can be tracked by examining the "dn" and "ani" fields of the interface. Also, for billing purposes, each call is assigned a unique call_id so that any usage fees (e.g., long distance charges) can be assessed to the account. The state of the call (e.g., dialing or talking) is also provided and may change while the interface is in use. Similarly, in a packet-based environment, the system may identify the address or name of the gateway or service that is converting the packet-based call into a circuit-switched call relatively near one of the telephone endpoints, if necessary. In addition to utilizing this interface for active calls, the system may also utilize this interface to review billing records.

Figure 5:
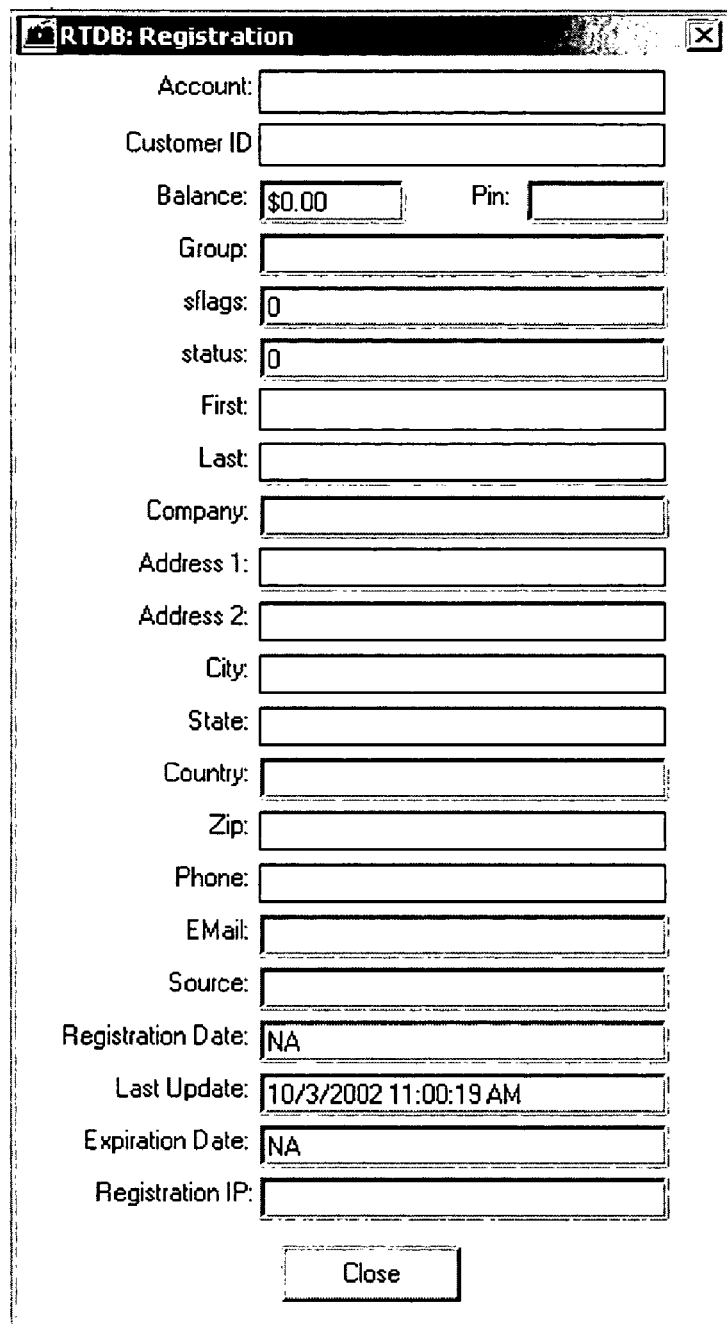
FIG. 5 is a screenshot of an exemplary user account monitoring portion of a graphical user interface (GUI)

In addition to information about a call, an administrator may also want to obtain information about one of the endpoints of the call. By using a corresponding selection method (e.g., by double clicking or right clicking) on a corresponding indicator bar, the administrator may be provided with an interface such as the exemplary interface shown in FIG. 5. This interface provides account number, customer number and telephone number (labeled "Phone") information about a customer. (In a call in which both endpoints are controlled by the system, the administrator may need to be prompted for or otherwise differentiate for which of the two endpoints the administrator is seeking information. One exemplary interface is a second menu that appears when the administrator right clicks on the corresponding indicator bar. Such a second menu could have plural options for what type of information is to be displayed: (1) call detail information, (2) caller account information, (3) callee account information, (4) caller equipment information, and (5) callee equipment information.)

Figure 6:
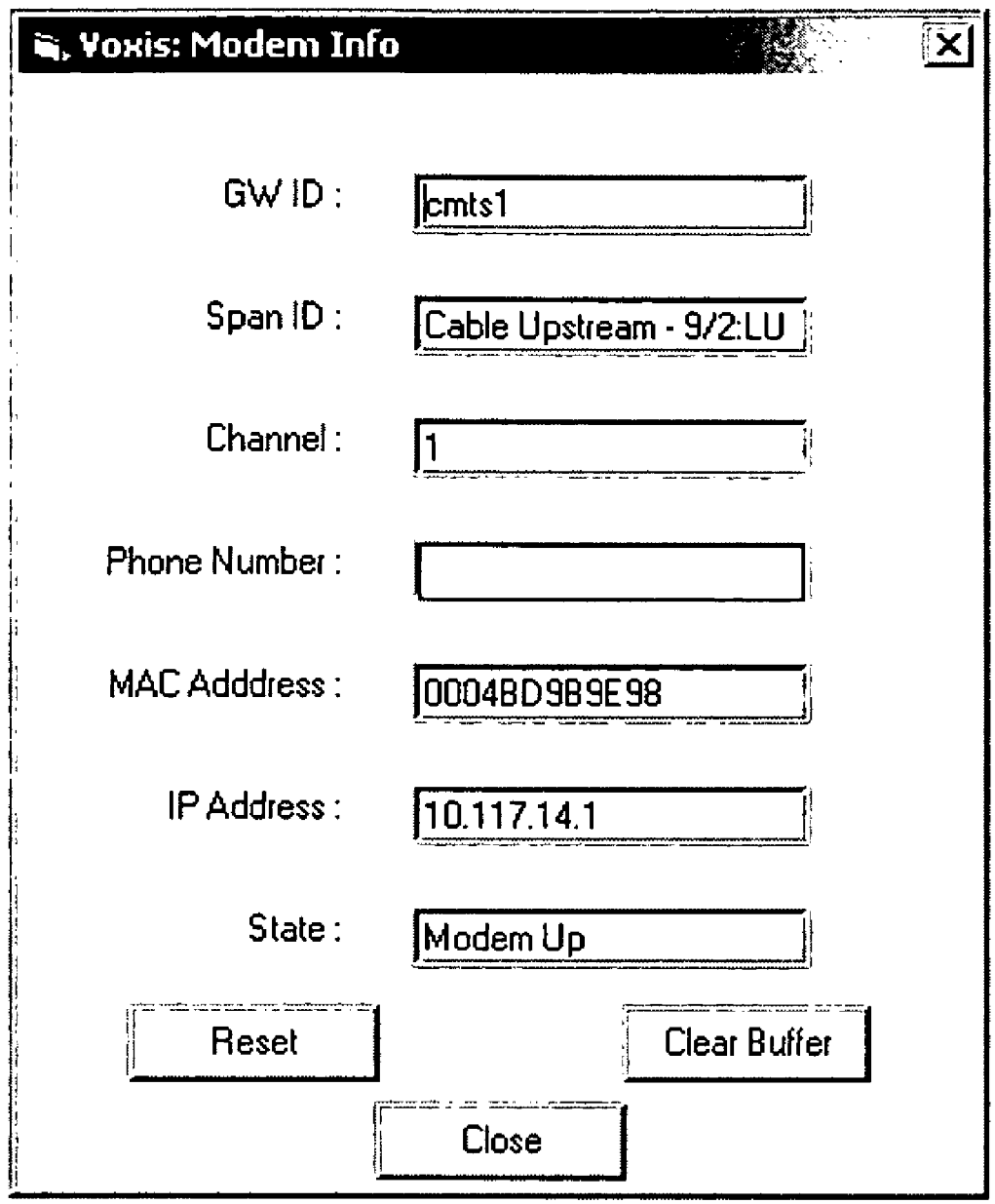
FIG. 6 is a screenshot of an exemplary end-user monitoring portion of a graphical user interface (GUI) for monitoring the status of telephony equipment.

Utilizing another corresponding selection method (e.g., using the second menu described above or triple clicking), the administrator may further request information about the equipment of at least one end of a call represented by one of the indicator bars of the interface of FIG. 3. In a packet-based communication system, an interface such as the interface shown in FIG. 6, provides information about the equipment servicing a corresponding call. A gateway ID (GW ID) identifies which gateway a call is communicating. Similarly, a span ID describes which span is currently carrying the call (and therefore on which span an administrator would find the call on a visual display such as the display of FIG. 3). Other equipment-based information, like the IP Address and MAC address of the equipment, may also be displayed. In the context of equipment that supports more than one telephone endpoint at the same IP address or MAC address, a corresponding identifier identifying which endpoint is associated with the call is likewise displayed. For example, in a premises having a two-line system, a port number or other identifier identifies which of the two lines is being used.

As described above, an administrator can monitor a series of calls that are dialing or in progress, but an administrator may also determine that some equipment is not properly functioning (or at least not functioning in the way that the monitoring system expects). Because of varying levels of knowledge or experience, the response of an administrator when faced with a problem identified by the system may vary from administrator to administrator. In order to provide a consistent level of responsiveness and quality in responding to problems, a system administrator may rely on a problem database or tracking system that includes known problem scenarios.

Figure 7:
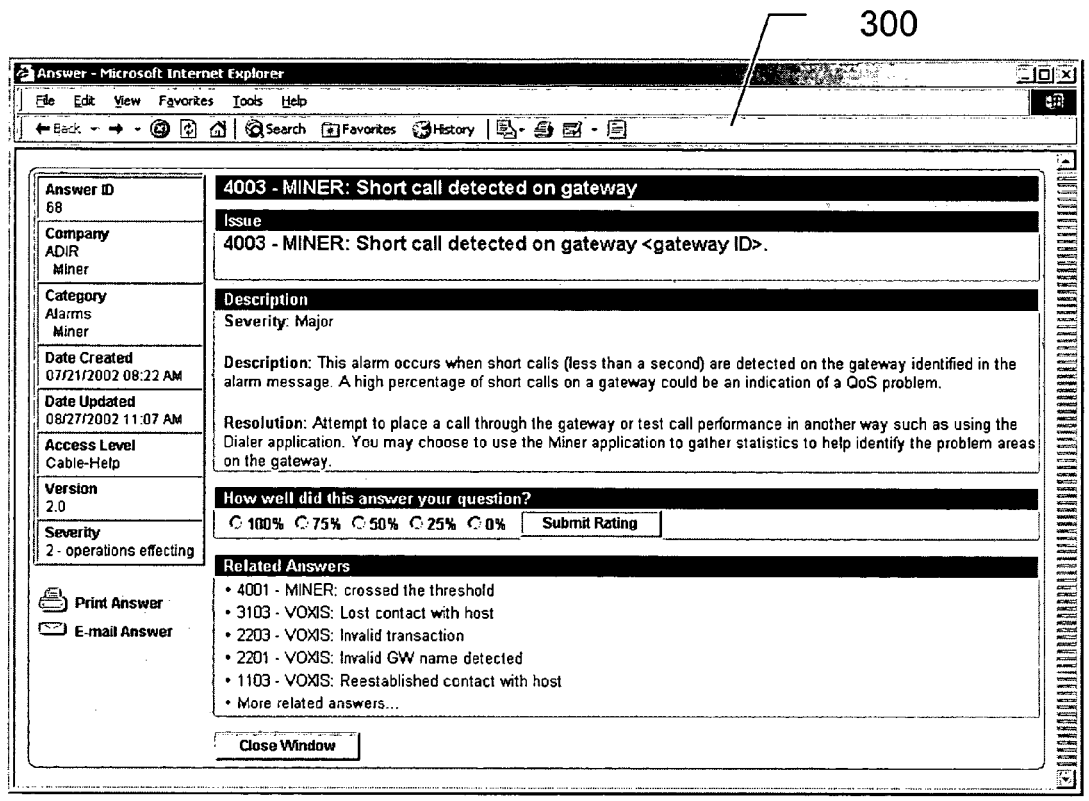
FIG. 7 is a screenshot of an exemplary user interface that provides technical service linked to a problem identified by a component of the monitoring system.

As shown in FIG. 7, an interface 300 to a problem tracking system enables an administrator to determine the meanings of various error conditions. In the example of FIG. 7, an administrator, in response to clicking on button 205 (FIG. 2), is informed that an error condition having an error code of "4003" is present. The cause of the exemplary condition is described in the "Description" section, and at least one possible resolution, if known, is described in the "Resolution" section. In the example, the error corresponds not to a call that is currently failing but rather to a call that previously failed within the system. Such a "post-mortem" analysis is done by a data "miner" application running in the background or on another system that reviews records relating to previous calls. In the example, the miner detected that a number of short calls (e.g., calls where a difference between the off-hook and on-hook times of the calls were smaller than a time threshold (.e.g., 5 seconds)) passing through a gateway for which the miner was responsible exceeded a repeatability threshold (e.g., two at the same gateway within an hour). Such short calls may be indicative of a poor (but reparable) level of quality of the voice connection between the caller and the callee.

As a result of the error, the administrator is informed of a possible response which, in the example, involves manually trying out the connection by placing a call through the same gateway as the one potentially experiencing the problem. (This may involve using special tools to route a call through a specified gateway which is other than the gateway closest to the administrator. However, if the administrator can force a call to be routed through the same gateway as may be experiencing a problem, the administrator may be able to repeat the "error" condition(s).) Alternatively, additional analysis of the statistics gathered by the miner tool(s) may provide additional information about whether an error condition really exists. Thus, the administrator may request that a more complete maintenance analysis is performed, e.g., using the "Maintenance" button (FIG. 2).

Analysis of these types of "problems" must be applied reasonably in light of the fact that conditions other than quality or errors could be responsible for the miner detecting this "error". For example, a customer may have hung up within the time threshold because the other party had a bad cellular signal that is completely independent of the quality monitored by the system. Alternatively, a caller could have hung up because it realized that it had dialed a wrong number or had another incoming call via call waiting. Thus, the resolution process may advise the administrator that, after performing a series of quality checks, the system is operating normally and that the "error" should be cleared and ignored.

While the above example was given in terms of an administrator responding to a particular alarm code, an administrator may also utilize the problem tracking system in order to answer a question about how to do a particular task. For example, if the administrator receives an email from a vendor saying that there is an update available for a piece of equipment managed by the telephony system, the administrator may want to update the equipment but might not know how to. Similarly, if a piece of equipment (e.g., a router) appears to be having decreasing performance, the administrator may want to determine what should be done in response. Accordingly, the problem tracking system also provides an interface by which an administrator can ask a question to determine how to perform a desired task.

As shown in FIG. 8a, the administrator has requested information on how to respond to the above-described situation where it appears that a router's performance is decreasing. (Such an interface may be provided by a custom solution or a general purpose tool, such as a web browser.) The system performs a search (e.g., against a database or other help files) and determines that there is a condition that matches the criteria of the question. Accordingly, in response the system provides a description of the perceived problem as well as an ordered list of three possible resolutions (e.g., in HTML, XML or another format). Each of these resolutions is accompanied by an interface that allows the administrator to rate whether the possible resolution actually addressed the problem. As shown in FIG. 7, the interface may also include a portion that enables the system to track whether the administrator thought that the answer (i.e., the description and possible resolutions) properly addressed the question that the administrator asked. For example, if the administrator asked about "routers" and instead got unrelated information about equipment at end-user premises, the administrator may be left unsatisfied with the answer and probably would not want to receive the same answer the next time that he posed the same question. (By selecting that the answer did not address the question fully, the system may provide back to the interface an answer different than the one previously presented to see if the new answer better addresses the question or issue.)

As can be seen from the above description, the process of advising an administrator on how to respond should be a dynamic process that changes over time as the administrator provides feedback to the system, or as new problems arise and new resolution techniques are created and tested. For example, at initial system deployment, an initial set of problems and resolutions is configured within the system. Within this initial configuration, the system includes a series of initial rankings that determine an order in which possible resolutions are displayed. Returning to the example of FIG. 8a, initially the system is configured to provide an ordered list of possible resolutions where the first proposed solution relates to editing routing rules to reduce their complexity. However, by tracking the problem resolution scores entered by the administrator(s), the system can determine whether the ordered list accurately reflects the most effective solution to the identified problem.

If the system determines that the ordering of possible resolutions does not, in fact, reflect the most effective solution to the identified problem, the system may adapt its behavior to change the order of the problem resolutions provided to the administrator. In response to such an adaptation, the system may alter the interface of FIG. 8a and replace it with the interface of FIG. 8b, such that the first and second possible resolutions are switched between the two.

Similarly, as discussed above with reference to FIG. 7, if the answer to a particular question gets a poor response score, the system may alter the order of answers that the system provides when asked the same question again later. For example, when asked "update router", the system may determine that there are two possible scenarios, each with their own description and possible resolutions that could correspond to those keywords. First, the administrator could be asking about how to update routing tables within a router. Second, the administrator could be asking how to update the software within the router that uses the existing routing tables. For this example, it can be assumed that the system is initially configured to provide the first answer in response to those keywords because routing tables are updated more frequently than software. However, it may occur that all the administrators know how to update routing tables without asking the system. Thus, in practice it ends up that the administrators are more often asking about how to update the software because (1) it happens so infrequently that it is hard to remember how to do it and (2) each router may have its own unique way of being upgraded. It would, therefore, be frustrating for the administrator(s) to always be provided with the first answer as a first response. Accordingly, if the system receives a sufficient number of poor ratings for an answer, the answer can be demoted in its order of importance such that it is provided after a currently next lower rule. This results in providing dynamic answers to questions using known keywords.

In addition to dynamically altering the order of resolution procedures, additional procedures may be added to the problem resolution system as new techniques are developed. The system may require that a supervisor approve the procedure or steps before it is made available generally. In addition, informal resolution procedures may also be added such that those procedures can be used if approved methods are unsuccessful. By providing feedback on the unapproved procedures, data can be automatically collected on their efficiency.

In addition to errors reported by the miner and questions posed by the administrator, the system may detect "real-time" errors, warning or conditions that need to be brought to the attention of the administrator. As shown in the example of FIG. 9, the monitoring system provides an interface to the administrator that identifies that a switch (identified as equipment type "SW 55") from a company called "Comp_1" is reporting (or had reported) an error type 55. Along with the error information, the system retrieves from the database or help system the error description and at least one possible resolution, if known.

In the example of FIG. 9, the resolution specified by the problem tracking system requires additional knowledge that an administrator may or may not have. For example, the administrator on duty may not know how to find the manufacturer's web site or mark the equipment as going off-line. Accordingly, it would be helpful to be able to avoid problems arising from variations in the knowledge of the administrator. One way that variations can be accounted for is to make the instructions so detailed that no real knowledge is required. However, such detail in human readable directions-form is often cumbersome to create. Also, since one can never anticipate what instructions may be misinterpreted, no directions to an administrator are ever going to be fool proof.

As an alternate method of achieving the improved error management, the system of the present invention may instead be configured with at least one component that performs, on behalf of the administrator, the steps described by a corresponding resolution process. For example, as shown in FIG. 10, the upgrade steps of FIG. 9 to be performed by the administrator can instead be performed by the system using an appropriately programmed component (e.g., any one or a combination of a script, a program, an active control component such as an ActiveX control or a widget). By selecting the "Run script" button on the interface of FIG. 10, the system takes over the performance of the steps described in the corresponding resolution. To achieve this level of dynamic help, the system must include the ability to provide to the script the identifier(s) of the equipment that is being manipulated. For example, the system must provide to the script that the equipment ID is 0x1234 (i.e., the number 1234 in hexadecimal format) in addition to providing the type of equipment and the error type. This will enable the system to determine or look up at what address the equipment currently resides so that it may be made the destination of the appropriate messages. (By correlating the ID to the address, the system can distinguish between two switches in the system that are made by the same manufacturer but for which only one is currently malfunctioning.)

In the example, the switch with ID 0x1234 is reporting an error type 55. By looking up the name or IP address of the switch with that ID, the system can execute a script that either (1) directly ftp's the appropriate file from the manufacturer's web site (by looking up the corresponding web site as stored in the system by company name and equipment type) to the appropriate location specified by the script, or (2) establishes a connection to the appropriate ftp site but requires the administrator to search for and specify the file to be downloaded such that the file is downloaded to the appropriate location expected by the script. The system would then utilize a second ftp session (or other communications session) to move the downloaded file to the location specified by the router's firmware such that the file can be written to the memory when the router reboots. The system can then update the routing rules such that no other calls are routed through the router. The script can then continue to request the status of the router until it determines that no calls are going through the router. After the router becomes quiescent, the script can remotely cycle the power of the router such that it finds the appropriate file and writes the file to its memory during the power-on process. (It should be noted that since this process may be lengthy, the script may run in the background and produce an output file that can be checked to determine where in the process the update currently is.)

The above techniques of equipment ID-specific help can be integrated into the context-specific help menus that are available to the administrator. Referring to the indicator bar 225 of FIG. 3, by right clicking on the bar 225, the system can generate system specific help that is not only directed to the type of equipment that is experiencing problems, but also the specifics of the equipment (e.g., its MAC address, IP address or domain name) such that the equipment can be interacted with by a script, as described above. This is because the system knows what equipment corresponds to which indicator bar at the time the indicator bar is selected. Thus, this information just needs to be applied as an input to the help system when the help system is being invoked or activated.

Similarly, interfaces other than the interfaces described or illustrated herein can be used to generate context-specific help for other equipment monitored by the system. In one embodiment, a physical layout diagram of the connections between network components (e.g., routers, gateways, customer premises equipment, test devices, or any other telephony providing equipment) enables each of the various network components to be separately and uniquely identified such that they may each be addressed by one or more scripts in response to selecting their graphical representation. As an example, when a router experiencing a problem is selected by right clicking its corresponding icon, a context-specific help is invoked for the router that enables tests (such as ping) to be automatically directed at the appropriate router.

Moreover, not only may the identification of the router aid in providing scripting support, the identification may also enable equipment specific help. One example of such help is help that remembers not only what answers were helpful for a particular type of equipment generally, but what answers were most helpful for this particular instance of the particular type of equipment. For example, more often than not, a slow down in performance of a first router may be caused by complex rules. However, more often than not, a slow down in performance of a second router may be caused by the fact that the second router shares its CPU with another process that runs periodically. Thus, for the second router, the help should be tailored to the specifics of the machine, not just the machine type. By tracking helpfulness of answers on a machine-by-machine basis, better help may be achieved.

Just as machine-specific help can be provided by the system, so too can user-specific or time-specific help. By tracking how users asked questions or responded to scenarios, the system can more quickly provide a "better" answer to a user. This user identification can, as described above, occur during the authentication process. This user-specific help could result in one administrator obtaining the interface of FIG. 8a while another administrator obtains the interface of FIG. 8b in response to essentially the same question at essentially the same time.

As to time-specific help, slow downs in a piece of equipment may be normal for certain periods of the day based on background activities that are performed by the machine (e.g., updating of routing tables). Thus, a system that takes time into consideration during processing may also be better tailored to issues arising within the system.

As described above, a portion of the system is able to, in the background, monitor the status of various components by performing a "post-mortem" analysis of calls to determine if issues potentially arose during the calls. One such issue is poor quality of service that can be evidenced by a series of short duration calls through the same resource (e.g., gateway or router). Other quality of service issues may also be uncovered through the use of pro-active quality monitoring. One such technique is the use of an automated call completion and data collection component that tests quality by completing testing calls. Test calls involve the completion of a call over a communications link to be tested. After the call has been connected, a specified signal (e.g., a pre-recorded voice signal) is played from the caller end to the callee end, and/or vice versa. By determining the quality of the received call (e.g., using voice recognition or other objective tests such as signal to noise ratios), the system can determine if a communications link should continue to be used, taken out of service, or put back into service.

In addition to pre-recorded signals, the system can determine quality issues corresponding to other packet-related issues that can effect voice quality, such as latency and jitter. FIG. 2 shows a "Ping/Traceroute" button that can be used to determine packet-related timing issues. By looking into the length of time that packets take from one point to another and back, and by examining the path(s) that packets take along that round-trip journey, the system can determine if the associated delays and paths are acceptable for various levels of quality. Where the paths and times are not in compliance, the system may exclude specified paths from being used. Conversely, if a previously poor path returns to being an acceptable path, the system can place that path back into its routing system.

Similarly, the system can measure the variation in inter-arrival times between adjacent or related packets. By determining such a variation, the system can determine if a link will appear to a user to be distorted. Thresholds can be specified that cause a link to be considered within or outside of various levels of quality. Packet loss between points can be measured in a similar fashion as yet another quality measurement.

Figure 11:
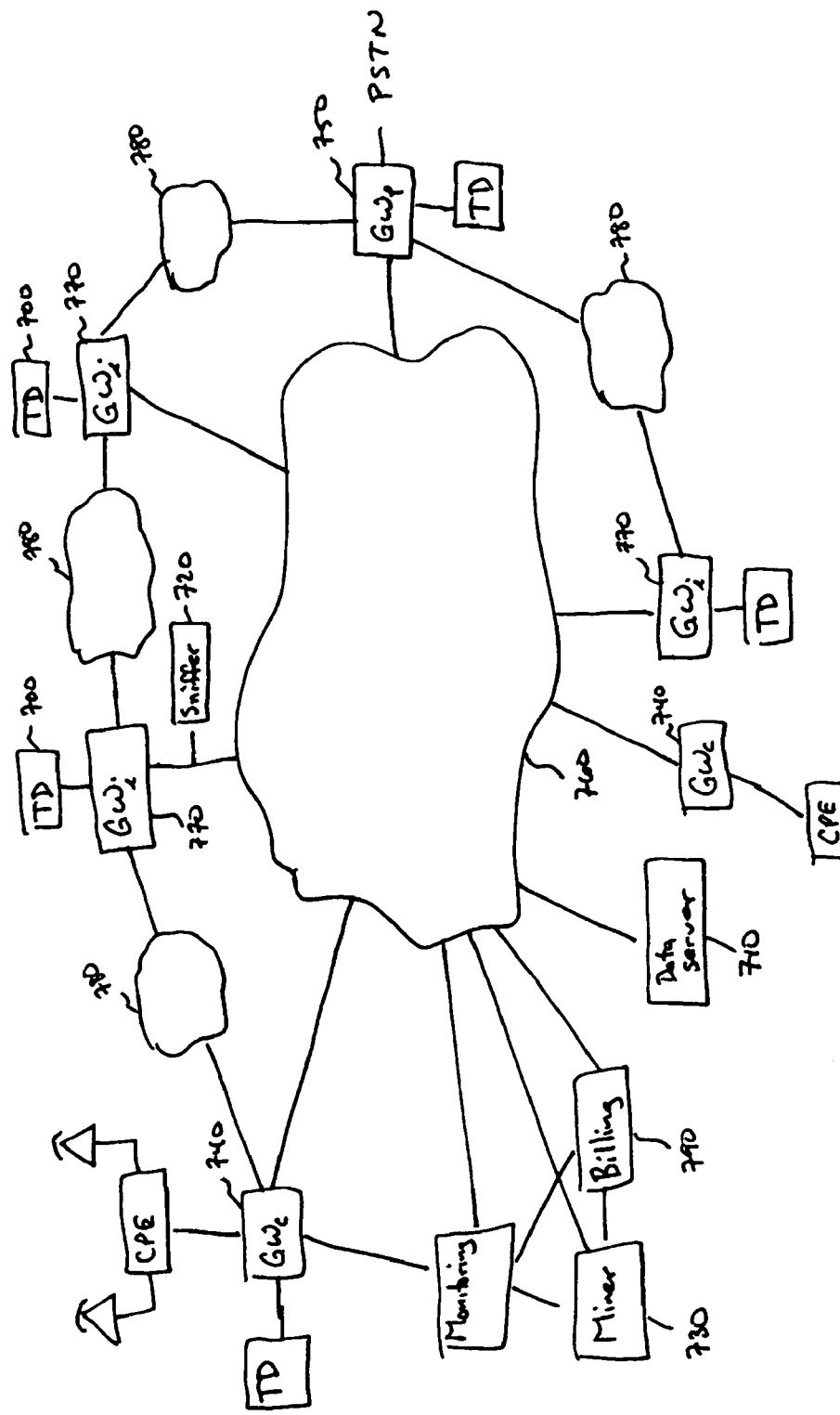
FIG. 11 is an illustration of a network configuration including a telephony monitoring system using gateways to coordinate calls and test devices to test the quality of service across various links.

In packet-based analyses, the system can be configured to utilize pre-programmed IP based test devices (TDs) 700, such as those shown in FIG. 11, that periodically exchange a series of packets at various points within the network. Since test these devices 700 are IP-based, the devices 700 can then connect (e.g., using sockets) to a server 710 in the system which acts as a collection point for the data. Similarly, rather than separately exchanging packets, the system can be configured to use "packet sniffers" 720 at various times that take snapshots of the data packets on the network being monitored by the sniffers 720. This data, like the data from the test device, can be forwarded to the collection point provided by the server 710. The data miner application 730 can then perform its standard "post-mortem" on the call statistics from the test devices or packet sniffers as if they are regular calls by obtaining the latest collected data from the data server 710 (e.g., via ftp or a network-based file system). This enables the system to be more proactive about its quality monitoring.

One result of performing quality monitoring activities over various links is that a customer-end gateway 740 controlling voice traffic for one or more set of customer premise equipment (e.g., cable-based, packet voice telephone equipment in a customer home or office) may decide that the route to the PSTN gateway 750 is experiencing quality issues when using standard IP routing over the network cloud 760, only a portion of which the system may have complete control. Accordingly, rather than using lower-level IP-based routing between the customer-end gateway 740 and the PSTN gateway 750, the system may, at least partially, control the path between those gateways 740 and 750 by utilizing a higher level routing (e.g., application layer routing) forcing packets to go between the customer-end gateway 740, at least one intermediate gateway 770 and the PSTN gateway 750. This added control over the path may help in certain situations (e.g., packet loss due to perceived congestion or jitter) and provides greater control over the flow of voice packets. Such a routing process attempts to "route around" a problem arising in a portion of the network 760 over which the system does not have adequate control (or potentially any control).

As shown in FIG. 11, communications between gateways 740 and 750 may be by way of intermediate gateways 770. Communication with those intermediate gateways 770 may be by either one, or both, of the network cloud 760 or over private networks 780 that can be either packet-switched or dedicated (e.g., leased or circuit-switched) links.

In addition to the call monitoring processes described above, FIG. 11 illustrates that a billing module 790 monitors call set-up and shut-down procedures in order to facilitate billing. The billing module 790 determines if customer premises equipment (CPE) is considered to be authorized to use the network in general. (Depending on the system configuration, the system may allow CPE not previously authorized (unprovisioned equipment) to use the network for certain types of calls, like emergency 911 services, contacting customer support to open a new account, and toll-free calling.) Then, if so, the billing module determines if the type of call being placed by the CPE is authorized by the CPE's status. In addition to statuses of unprovisioned equipment above, statuses of provisioned (authorized) equipment may include local calls only, local and long distance but not international, local/long distance/international, non-PSTN based calls such that the call stays "on network" only, etc. If the status of the CPE allows the CPE to complete the type of call requested, the gateway 740 helps to establish the connection to the called party.

At the end of a call, the billing module 790 is informed of the total length of the call. Based on established billing rules (e.g., using time of day, call destination, etc.), the billing module 790 can determine a total charge for the call. The calls for each customer are stored in a database that can be queried at the end of a billing cycle to generate a customer bill.

In an example where the customer's telephony bill is to be integrated with the existing cable bill, the system of the present invention communicates the bill to the cable company in time to include the individual charges on the customer's bill.

As discussed briefly above, the system can provide a self-provisioning service or self-subscribing service by allowing a customer to purchase new packet-based voice telephone equipment and plug it an existing cable connection. The customer can then use the new telephone equipment to contact customer service to activate the service. Since the gateway 740 sees that the call is to customer service, even though the equipment is not yet recognized, the gateway 740 can allow the call to be established. Similarly, if the gateway 740 recognizes unprovisioned equipment that is not calling emergency service, it can route the call to customer services, even if a number other than that of customer services was entered. This reduces the amount of information that the new customer has to know in order to obtain service.

In yet another embodiment, the new customer may utilize a computer interface (e.g., the world wide web) to register and activate its service, without ever talking to a customer service agent. The customer need only provide appropriate billing information and the identifier (e.g., MAC address) of the CPE to be used. By using existing cable services billing information (e.g., a combination of cable account number, social-security number and zip code) or by using credit card information, the user can activate service immediately. In the case of adding the service to an existing cable account, the system would interact with the cable company to identify the new telephony equipment and begin billing the monthly charges associated with the new service. This cable account-based authorization, the system of the present invention and the cable system may also be programmed to ensure that the customer is in good standing before authorizing additional services be charged to the cable account. If the customer is not in good standing, the credit card authentication can be used instead.

In the case where the customer does not yet have a CPE, the customer can still utilize a computer interface to order new telephony service as described above. However, in response, the system will schedule delivery of new CPE (e.g., either by placing a purchase order with a third party that will deliver the CPE or by establishing a work order that the telephony or cable company fills to deliver or deliver and install the new CPE). If the installation of the CPE is known to require additional components (e.g., cable splitters or filters), then the interface should provide the option of including those additional components on the work order or purchase order as well. Once the new CPE is installed, the system of the present invention can be instructed to include the identifier of the new CPE in its list of provisioned equipment. Once the CPE has authenticated itself to the system as provisioned equipment, the system can perform a test call to the new CPE to determine if it is properly installed.

One advantage to such a graphical interface showing cable devices is that, if the devices sharing a single cable are graphically represented in order of their distance from the gateway, then a break or cut in the cable will be easily identified as the network administrator can visually determine indicator bars corresponding to the customer premises after which no more customer premise equipment is responding. Thus, the location of the break will be between the last responding CPE and the first non-responding CPE. (If a CPE just after the last responding CPE was already known to be faulty before the cable break, that must be taken into consideration as well). By monitoring when multiple CPEs stop responding almost simultaneously while other CPEs on the same cable are still responding, the system can start performing testing to see if a cable break is likely.

Numerous modifications to the above teachings can be made in light of the techniques taught herein. For example, while the above discussion has been made for convenience to a packet-based telephony system, the teachings are equally applicable to packet-based systems that do not carry voice. Thus, the system of the present invention can also be utilized to monitor non-voice systems. Thus, the scope of the present invention is not limited by the above descriptions, but only by the attached claims.

The invention claimed is:

1. A computer-implemented method for monitoring a telephony system, comprising:
    detecting an error condition in a network component, said error condition including an error identifier and an identifier for the network component;
    obtaining electronic information corresponding to problem resolution techniques for the error identifier and equipment of a type of the network component;
    displaying the electronic information to an administrator in order to facilitate resolution of the error condition; and
    executing a computer component to perform the problem resolution techniques by utilizing the identifier for the network component to obtain an address for the network component and using the address to communicate with the network component to correct the error condition.

2. The method as claimed in claim 1, wherein the network component comprises at least one of a router, a gateway and customer premises equipment.

3. The method as claimed in claim 1, wherein the electronic information comprises at least one of an HTML document and an XML document.

4. The method as claimed in claim 1, wherein the computer component comprises at least one of a script, an executable program, and an active control.

5. The method as claimed in claim 1, wherein the step of detecting comprises connecting to the network component using IP-based communications.

6. The method as claimed in claim 1, wherein the identifier for the network component comprises an IP address.

7. The method as claimed in claim 1, wherein the identifier for the network component comprises a domain name.

8. A computer program product for controlling a computer to monitor a telephony system, comprising a computer readable medium and instructions embedded in the computer readable medium for controlling the computer to perform the steps of:
    detecting an error condition in a network component, said error condition including an error identifier and an identifier for the network component;
    obtaining electronic information corresponding to problem resolution techniques for the error identifier and equipment of a type of the network component;
    displaying the electronic information to an administrator in order to facilitate resolution of the error condition; and
    executing a computer component to perform the problem resolution techniques by utilizing the identifier for the network component to obtain an address for the network component and using the address to communicate with the network component to correct the error condition.

9. The computer program product as claimed in claim 8, wherein the network component comprises at least one of a router, a gateway and customer premises equipment.

10. The computer program product as claimed in claim 8, wherein the electronic information comprises at least one of an HTML document and an XML document.

11. The computer program product as claimed in claim 8, wherein the computer component comprises at least one of a script, an executable program, and an active control.

12. The computer program product as claimed in claim 8, wherein the step of detecting comprises connecting to the network component using IP-based communications.

13. The computer program product as claimed in claim 8, wherein the identifier for the network component comprises an IP address.

14. The computer program product as claimed in claim 8, wherein the identifier for the network component comprises a domain name.

15. A system for monitoring a telephony system, comprising:
    a first component configured to detect an error condition in a network component, said error condition including an error identifier and an identifier for the network component;
    a second component configured to obtain electronic information corresponding to problem resolution techniques for the error identifier and equipment of a type of the network component;
    a third component configured to display the electronic information to an administrator in order to facilitate resolution of the error condition; and
    a fourth component configured to execute a computer code to perform the problem resolution techniques by utilizing the identifier for the network component to obtain an address for the network component and using the address to communicate with the network component to correct the error condition.

16. The system as claimed in claim 15, wherein the network component comprises at least one of a router, a gateway and customer premises equipment.

17. The system as claimed in claim 15, wherein the electronic information comprises at least one of an HTML document and an XML document.

18. The system as claimed in claim 15, wherein the computer code comprises at least one of a script, an executable program, and an active control.

19. The system as claimed in claim 15, wherein the step of detecting comprises connecting to the network component using IP-based communications.

20. The system as claimed in claim 15, wherein the identifier for the network component comprises an IP address.

* * * * *